US 11,073,151 B2

(12) United States Patent
Gillespie

(10) Patent No.: US 11,073,151 B2
(45) Date of Patent: Jul. 27, 2021

(54) ENERGY GENERATING SYSTEM AND METHOD

(71) Applicant: William Dennis Gillespie, Pinetown (ZA)

(72) Inventor: William Dennis Gillespie, Pinetown (ZA)

( * ) Notice: Subject to any disclaimer, the term of this patent is extended or adjusted under 35 U.S.C. 154(b) by 62 days.

(21) Appl. No.: 15/566,277

(22) PCT Filed: Apr. 13, 2016

(86) PCT No.: PCT/IB2016/052101
§ 371 (c)(1),
(2) Date: Oct. 13, 2017

(87) PCT Pub. No.: WO2016/166678
PCT Pub. Date: Oct. 20, 2016

(65) Prior Publication Data
US 2018/0100500 A1    Apr. 12, 2018

(30) Foreign Application Priority Data

Apr. 13, 2015 (GB) ..................................... 1506235

(51) Int. Cl.
*F04B 53/14* (2006.01)
*F03G 7/10* (2006.01)
(Continued)

(52) U.S. Cl.
CPC .......... *F04B 53/141* (2013.01); *F03B 13/189* (2013.01); *F03B 17/005* (2013.01);
(Continued)

(58) Field of Classification Search
CPC ......... F04B 53/141; F03B 17/005; F03G 7/10
See application file for complete search history.

(56) References Cited

U.S. PATENT DOCUMENTS

| 670,399 A | * | 3/1901 | Hilliard | F04B 53/141 |
| | | | | 417/92 |
| 1,760,213 A | * | 5/1930 | Schaer | F04B 9/1176 |
| | | | | 60/544 |

(Continued)

FOREIGN PATENT DOCUMENTS

| FR | 534682 A | 3/1922 |
| FR | 537002 A | 5/1922 |

(Continued)

OTHER PUBLICATIONS

International Search Report and Writtin Opinion, dated Jul. 14, 2016 in Connection with International Application No. PCT/IB2016/052101.

*Primary Examiner* — Sean Gugger
(74) *Attorney, Agent, or Firm* — Behmke Innovation Group LLC; James M. Behmke; Jonathon P. Western

(57) ABSTRACT

This invention relates to an energy generating system and method, particularly to a fluid actuated energy generating system and method employing multifarious mechanisms to produce energy. The system comprises first and second tower structures; means operable to displace fluid in the first tower structure, and means operable in response to fluid displaced from the first tower structure for displacing fluid in the second tower structure. The system also comprises means operable in response to fluid displaced from the second tower structure for generating energy; means for collecting fluid displaced from the second tower structure for return to the second tower structure; and means for receiving, in the first and second tower structures, fluid for maintaining a fluid level for operation of the system.

14 Claims, 6 Drawing Sheets

(51) Int. Cl.
*F03B 13/18* (2006.01)
*F03B 17/00* (2006.01)
*F03G 6/02* (2006.01)
*F04F 1/06* (2006.01)
*F25B 43/00* (2006.01)

(52) U.S. Cl.
CPC ............... *F03G 6/02* (2013.01); *F03G 7/10* (2013.01); *F04F 1/06* (2013.01); *F25B 43/006* (2013.01); *Y02E 10/30* (2013.01); *Y02E 10/46* (2013.01)

(56) References Cited

U.S. PATENT DOCUMENTS

| | | | | |
|---|---|---|---|---|
| 3,648,458 | A | * | 3/1972 | McAlister ............ F03B 17/005 60/415 |
| 4,443,707 | A | * | 4/1984 | Scieri ................... F03B 13/06 290/4 A |
| 4,583,368 | A | * | 4/1986 | Neuenschwander ..... F03G 3/00 60/398 |
| 8,030,790 | B2 | * | 10/2011 | Kamenov ............... F03B 13/06 290/43 |
| 8,127,542 | B1 | * | 3/2012 | Dolcimascolo ......... F03B 13/06 60/398 |
| 2004/0041401 | A1 | * | 3/2004 | Trenchev ................ F03G 7/10 290/1 R |
| 2010/0170242 | A1 | * | 7/2010 | Irps ....................... F03B 17/005 60/497 |
| 2010/0259044 | A1 | * | 10/2010 | Muchow ................ F03D 13/20 290/43 |
| 2011/0204645 | A1 | * | 8/2011 | Jacobson ............... F03B 13/08 290/54 |
| 2012/0049673 | A1 | * | 3/2012 | Koo ........................ F03B 7/00 310/80 |
| 2012/0301328 | A1 | * | 11/2012 | Adler ...................... F04B 3/00 417/246 |
| 2014/0130497 | A1 | * | 5/2014 | Anteau ................... F03G 7/04 60/639 |
| 2014/0175798 | A1 | * | 6/2014 | Hoose, Jr. ............... F03G 7/00 290/54 |
| 2015/0033717 | A1 | * | 2/2015 | Hsu ........................ F03G 7/05 60/325 |
| 2017/0070114 | A1 | * | 3/2017 | Yamano ................. F03G 3/00 |
| 2018/0149131 | A1 | * | 5/2018 | Alkhars ................. F03B 13/06 |
| 2018/0171814 | A1 | * | 6/2018 | Kile ....................... F03B 17/02 |
| 2018/0335012 | A1 | * | 11/2018 | Pezzia .................... F03B 17/04 |

FOREIGN PATENT DOCUMENTS

| | | |
|---|---|---|
| FR | 37707 E | 1/1931 |
| FR | 3000769 A3 | 7/2014 |
| GB | 312078 A | 6/1930 |

* cited by examiner

ENERGY GENERATING SYSTEM AND METHOD

CLAIM FOR PRIORITY

This application is a U.S. National Phase under 35 U.S.C. 371 of International Patent Application No. PCT/IB2016/052101, filed Apr. 13, 2016, which claims the priority of Great Britain Application No. 1506235.9, filed Apr. 13, 2015 the entire contents of which is incorporated herein by reference in its entirety.

FIELD OF INVENTION

This invention relates to an energy generating system and method, particularly to a fluid actuated energy generating system and method employing multifarious mechanisms to produce energy.

BACKGROUND OF THE INVENTION

Conventional systems for generating energy typically combust carbon based fuel such as coal to generate electricity. These conventional coal based electrical generating systems undesirably cause much harm to the environment as the combustion process produces pollutant by-products which contribute to global warming.

Nuclear power plants have been developed to address the above problems associated with coal fired energy plants as there is reduced production of air pollutants. However, nuclear based technologies sometimes have environmental problems associated therewith given the nature of the nuclear fuel used therein.

So called cleaner technologies to generate electricity such as solar, wind, sea powered systems ameliorate the above-mentioned problems to a great extent. However, it is desired to provide an alternate energy generating system.

SUMMARY OF THE INVENTION

According to a first aspect of the invention there is provided a system for generating energy comprising
  a first tower structure;
  a second tower structure;
    means operable to displace fluid in the first tower structure,
  means operable in response to fluid displaced from the first tower structure for displacing fluid in the second tower structure;
    means operable in response to fluid displaced from the second tower structure for generating energy; and
  means for receiving, in the first and second tower structures, fluid for maintaining a fluid level for operation of the system.
  It will be appreciated that the fluid associated with the first tower structure and the second tower structure may flow in first and second fluid circuits respectively, and wherein the first and second fluid circuits are fluidly insulated from each other.
  The system may comprise means for collecting fluid displaced from the second tower structure for return to the second tower structure. Instead, or in addition, the system may comprise means for transferring fluid displaced from the second tower structure to an external fluid source, for example a river, sea, lake, etc.
  The means to displace fluid in the first tower structure may comprise a displacement member operable piston fashion within the first tower structure between a first position and a second position wherein fluid is displaced in the first tower structure in response to displacement of the displacement member from the first position to the second position.
  The system may comprise a cam arrangement operable, by fluid exiting the second tower structure, to displace the displacement member tower structure in a reciprocating fashion between the first and second positions. The cam arrangement may comprise:
  a cam displaceable in response to fluid displaced from the second tower structure or an external source;
  a weighted member having a mass, wherein the weighted member is mechanically coupled to the cam to be raised and lowered by the cam in response to the displacement of the cam; and
  a lever coupled at one end to the displacement member, wherein the weighted member is configured to be raised and lowered onto an opposite end of the lever in response to displacement of the cam caused by fluid flow from fluid exiting the second tower structure so as to cause reciprocating driving of the displacement member between the first and second positions in the first tower structure.

Parts or elements of the system may be configured to operate automatically and/or function synchronously with other parts or elements of the system. Where any part or element of the system requires energy to operate and/or function, the energy may be provided in part or whole by energy generated by the system. The energy generated may be transmitted to an electricity grid.

The external fluid source may be configured to replace any fluid losses occurring, for example due to evaporation, spillage, leakage or any other causes, prior to and/or during operation of the apparatus. The external fluid source may be configured to fill or prime the system prior to operation and to maintain fluid operating levels within the system during operation. The fluid may be a liquid and may be water.

The external fluid source may comprise a tap (valve) with a liquid level monitoring mechanism that receives a fluid supply from an external source, for example a water supply. The fluid source may be employed to prime all of the system throughout before the system comes into operation and/or to top up the system as required.

The actuator may be moveable between a lower or first position and an upper or second position. Movement of the actuator from the lower position to the upper position (i.e. an upstroke) may displace fluid above the actuator within the second tower structure in an upwards direction so as to cause fluid to be discharged from the second tower structure. It may be that fluid discharged from the second tower structure exits through at least one outlet. It may be that at least one outlet is provided at or near to an upper end of the second tower structure. One or more additional outlets may be provided at the same height or at different heights. Fluid may be returned to the second tower structure when the actuator is in the lower position. Means may be provided to retain the fluid remaining in the second tower structure when the actuator is returned from the upper position to the lower position (i.e. a downstroke) at the upper position creating a space above actuator for receiving fluid for the next upstroke of the actuator.

Means may be provided to assist return movement of the actuator from the upper position to the lower position. The means for assisting return movement of the actuator may comprise one or more accumulators which comprise springs that store energy as the actuator moves from the first position to the second position and the stored energy is released to assist return movement of the actuator from the second position to the first position. Alternatively or additionally, the return means may comprise one or more fluid accumulators that store energy as the actuator moves from the first position to the second position and the stored energy is released to assist return movement of the actuator from the second position to the first position.

There may be two or more actuators arranged to operate so that, in use, fluid is continuously displaced in and exits from the second tower structure for actuating the energy generating means. In one arrangement, two actuators are arranged to operate in tandem whereby fluid in the second tower structure is continuously displaced by alternating the advancing and retracting movement of the actuators such that, as one actuator is advancing the other actuator is retracting.

The means for generating energy in response to fluid displaced from the second tower structure may comprise one or more devices, for example wheels or conveyors, responsive to water displaced from the second tower structure to provide an output for generating energy, for example a rotatable drive shaft for providing a power output capable of generating energy.

The system may comprise means for moving the actuator within the second tower structure from the lower position to the upper position. The means for moving the actuator may comprise a fluid. The fluid may be contained in the first tower structure. The first tower structure may be in fluid communication with the actuator such that fluid pressure in the first tower structure may be employed to move the actuator from the lower position to the upper position to displace fluid in the second tower structure and cause fluid to exit the second tower structure.

The first tower structure may be configured to apply pressure to the fluid in the first tower structure for moving the actuator from the lower position to the upper position. The first tower structure may comprise a displacement member configured to be displaceable between an upper or first position and a lower or second position for pressurising fluid in the first tower structure for moving the actuator from the lower position to the upper position in the second tower structure. The displacement member may be displaceable piston fashion within the first tower structure. The displacement member may be received in the upper end of the first tower structure. The displacement member may be responsive to fluid displaced from the second tower structure. The fluid contained in the first tower structure may be a liquid and may be substantially incompressible. The fluid may be oil. The fluid may be sealed within the first tower structure.

The fluids in the first and second tower structures may be the same or may be different.

It will be noted that the weight of the actuator may be less than the column of fluid in the second tower.

According to a second aspect of the invention, there is provided a fluid system comprising:
 a first fluid circuit;
 a second fluid circuit;
 means for generating energy in response to flow of fluid in the second fluid circuit from an upper level to a lower level, and
 means for returning fluid from the lower level to the upper level in response to an increase in fluid pressure in the first fluid circuit.

Fluid may be added to the first fluid circuit to replace fluid losses occurring, for example due to evaporation, spillage, leakage or any other causes, prior to and/or during operation of the system. The fluid in the first fluid circuit may be a liquid such as water. The fluid in the second fluid circuit may be a liquid and may be substantially incompressible such as oil.

The system may comprise any feature of the system according to the first aspect of the invention.

According to a third aspect of the invention, there is provided a method of generating energy comprising:
 providing a first tower structure containing fluid,
 providing a second tower structure containing fluid,
 using fluid pressure in the first tower structure to displace fluid in the second tower structure and cause fluid to exit the second tower structure,
 using fluid exiting the second tower structure to generate energy, and
 collecting fluid exiting the second tower structure downstream of the energy generating means, and
 providing an external source of fluid for maintaining a fluid level for carrying out the method.

Fluid may be added to replace fluid losses occurring, for example due to evaporation, spillage, leakage or any other causes, prior to and/or during operation of the method. The fluid in the second tower structure may be a liquid. The liquid may be water. The fluid in the first tower structure may be a liquid and may be substantially incompressible. The incompressible liquid may be oil.

The method may comprise any feature of the system according to the previous aspects of the invention.

Other features, benefits and advantages of the invention will be apparent from the description hereinafter of an exemplary embodiment intended to provide the person skilled in the art with a better understanding of the invention in each of its aspects.

Such embodiment is not intended to be limiting on the scope of the invention and the person skilled in the art will understand that any of the means and/or steps described in the embodiment may be replaced by other means capable of providing or performing the same function and the details of any feature or step is provided merely to satisfy the disclosure requirements and allow the person skilled in the art to perform the invention without admission that such feature or step is essential to the invention in any of its aspects.

With the foregoing in mind, the invention will now be described in more detail by way of example only with reference to the accompanying drawings in which like reference numerals are used to indicate the same or similar parts throughout.

DETAILED DESCRIPTION OF THE DRAWINGS

In the following description, for purposes of explanation, numerous specific details are set forth in order to provide a thorough understanding of an embodiment of the present disclosure. It will be evident, however, to one skilled in the art that the present disclosure may be practiced without these specific details.

Figure 1:
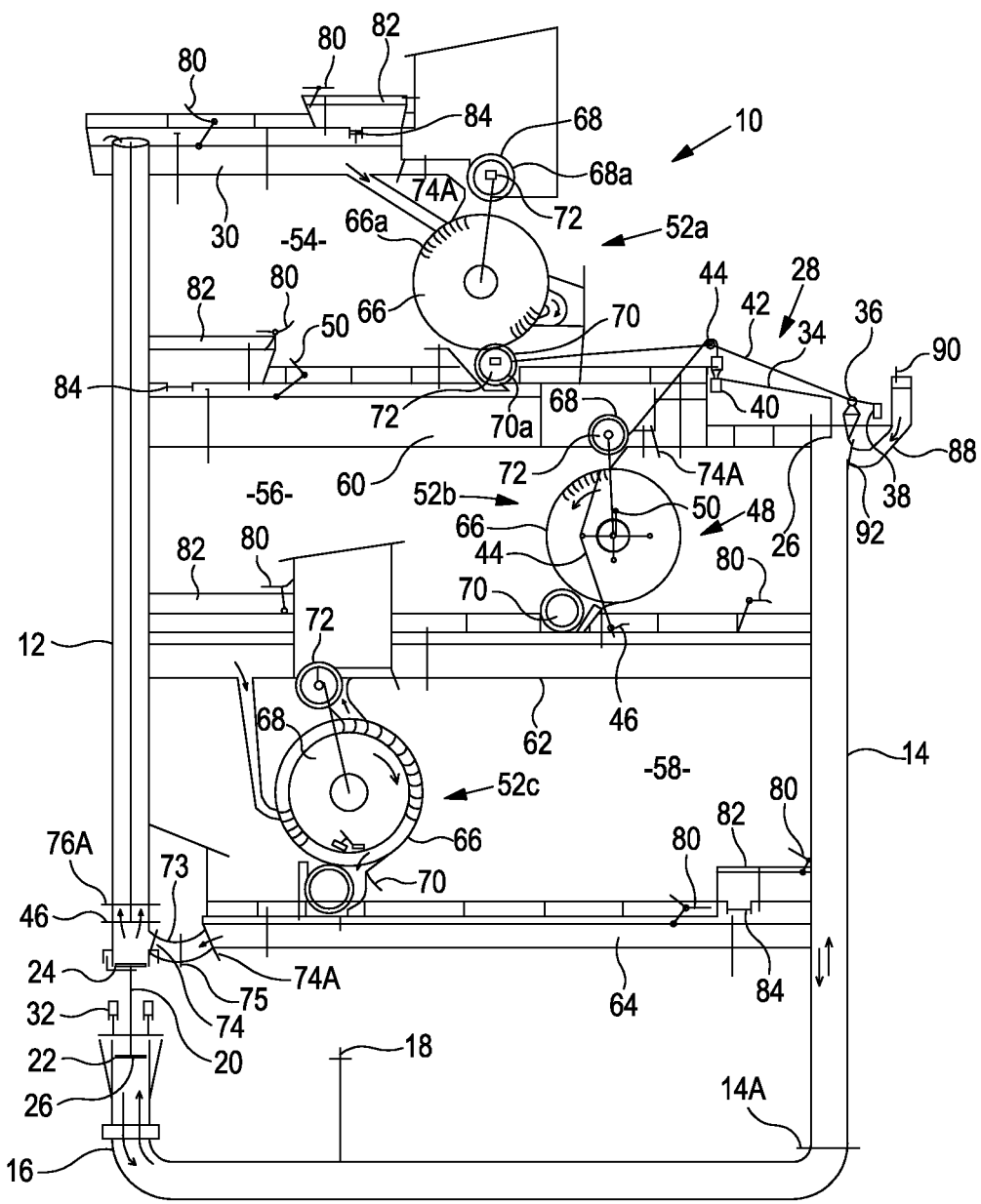
FIG. 1 shows a schematic illustration of a fluid system in accordance with the invention

Referring to FIG. 1 of the drawings an example of a fluid system for generating energy in accordance with the invention is generally indicated by reference numeral 10. The system 10 may be of a large scale and one or more portions thereof may be located above or below a surface. In some embodiments the system may be located on land. In some embodiments the system may be located on water. In some embodiments the system may be located on land and water. The system may be configured with some or all of the system above ground level and/or water level and/or some or all of the system below ground level and/or water level. It will be appreciated that energy generated by way of the system 10, for example, electricity may be channelled to one or more households, factories, or national energy grids, or the like. Where the system 10 is described with reference to one specific component, it will be noted that the system may be replicated with more than one component to provide the functionality described herein.

In one example embodiment, a substantial portion of the system may be located below ground.

The system 10 comprises a second tower structure 12 housing a second fluid forming part of a second fluid circuit and a first tower structure 14 housing a first fluid forming a first fluid circuit separate from the second fluid circuit, for example, in a fluidly insulated fashion. The first fluid may comprise water. The second fluid may comprise water, oil or other substantially incompressible fluid. The tower structures 12, 14 may be elongate substantially cylindrical structures. In other embodiments, not illustrated, the tower structures 12, 14 may be of different shapes and sizes.

The tower structures 12, 14 are arranged to extend vertically or substantially vertically. The first tower structure 14 is of approximately U-shape at the lower end providing with a short return leg 16. The second tower structure 12 is aligned with and spaced above the return leg 16 of the first tower structure 14. In other embodiments, not illustrated, one or more of the tower structures 12, 14 or part thereof may extend at an angle to the vertical. The second tower structure 12 is taller than the first tower structure 14. This is not essential and in other embodiments, the first tower structure 14 may be taller than the second tower structure 12. A valve 18 may be provided for filling and/or bleeding the first tower structure 14. A flow control mechanism 74A may be provided that is normally open but can be closed for carrying out repair or maintenance work on the tower structures 12, 14.

Figure 2:
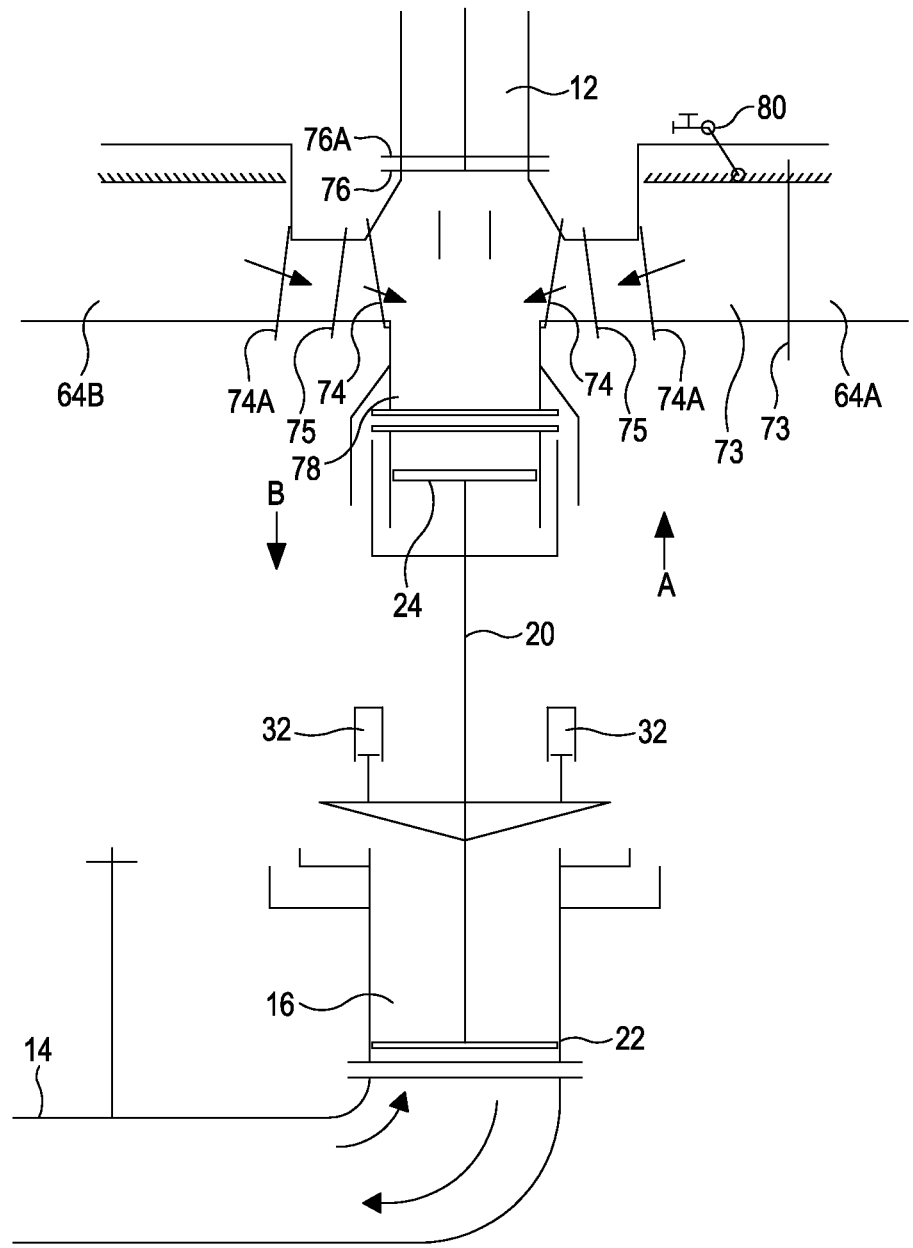
FIG. 2 shows a portion of the system shown in FIG. 1.

A second displacement member, actuator, or second piston 20 has a first or lower end portion 22 slidably received in a fluid tight manner in the return 16 of the first tower structure 14 and a second or upper end portion 24 slidably received in a fluid tight manner in the lower end of the second tower structure 12. The second piston 20 separates the second fluid in the second tower structure 12 from the first fluid in the first tower structure 14 and is displaceable piston-fashion in the direction of arrow A (upstroke) and arrow B (downstroke) between a lower position shown in FIGS. 1 and 2 and an upper position (not shown) in response to change in fluid pressure in the first tower structure 14 below the second piston 20 to control flow of fluid into and out of the second tower structure 12. Buffers, not illustrated, may be provided adjacent the second piston 20. The buffers are to cushion the second piston 20 as it comes to a stop in the lower position and/or the upper position.

Figure 3:
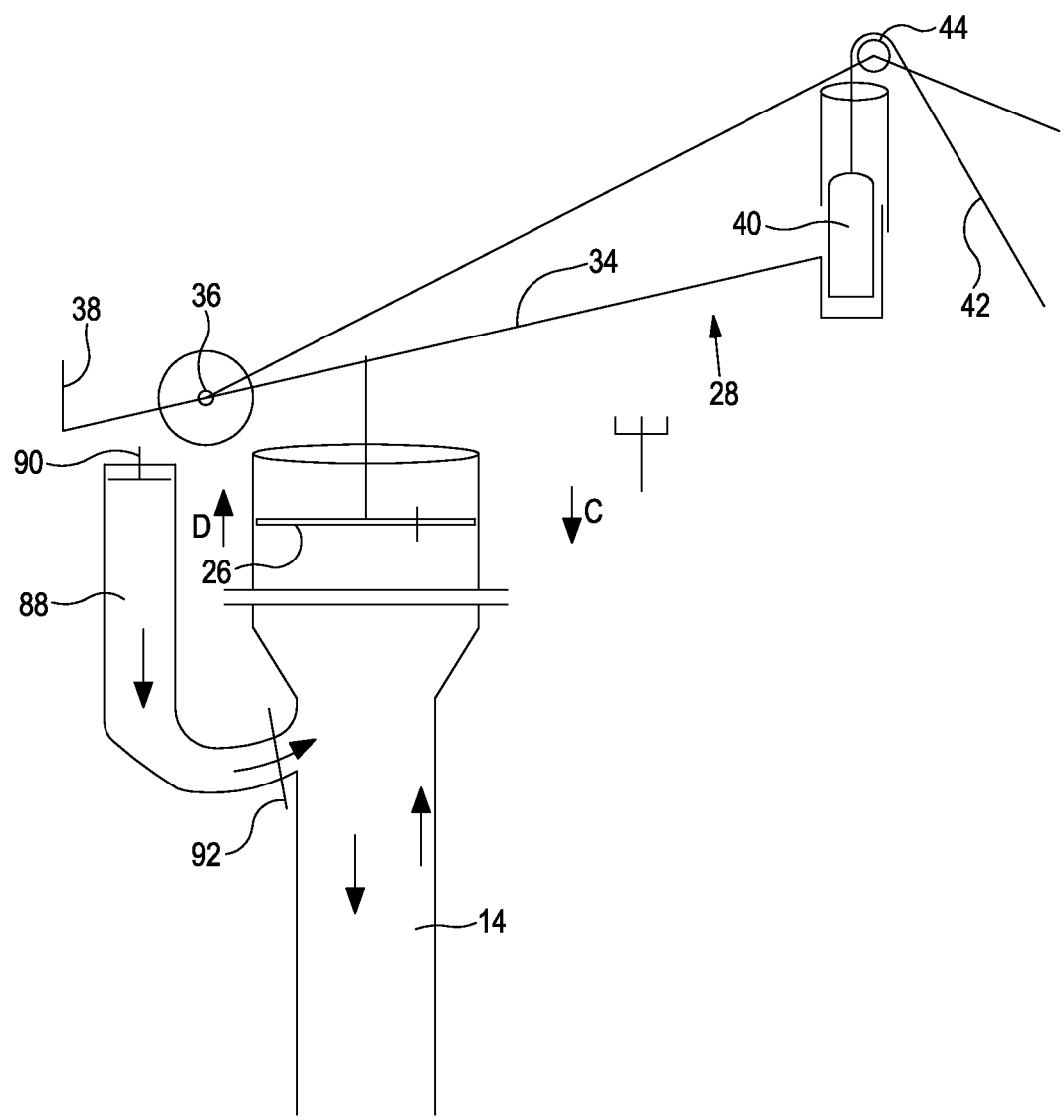
FIG. 3 shows another portion of the system shown in FIG. 1.

With reference now also to FIG. 3, a first displacement member or first piston 26 is slidably received in the upper end of the first tower structure 14 in a fluid tight manner. The first piston 26 is displaceable piston-fashion in the direction of arrow C (downstroke) and arrow D (upstroke) between an upper position shown in FIGS. 1 and 3 and a lower position (not shown) in response to operation of an actuator mechanism 28 to control fluid pressure in the first tower structure 14. In some embodiments, the first piston 26 may comprise a weight having a mass.

The fluid in the first tower structure 14 is substantially incompressible and is sealed within the first tower structure 14. The fluid acts on the lower end portion 22 of the second piston 20. As a result, when the second piston 20 is in the lower position shown in FIG. 1 and the first piston 26 is in the upper position shown in FIG. 1, operation of the actuator mechanism 28 to move the first piston 26 to the lower position increases the pressure of the fluid in the first tower structure 14 acting on the lower end 22 of the second piston 20 in the second tower structure 12 causing the second piston 20 to move to the upper position. As a result, fluid above the upper end 24 of the second piston 20 in the second tower structure 12 is raised and exits the upper end of the second tower structure 12 where it is collected in a reservoir 30. In some example embodiments, the reservoir 30 may receive fluid for topping up from an external source such as a river, sea, municipal water source, and the like. Operation of the actuator mechanism 28 to return the first piston 26 to the upper position allows the second piston 20 to return to the lower position.

Figure 4:
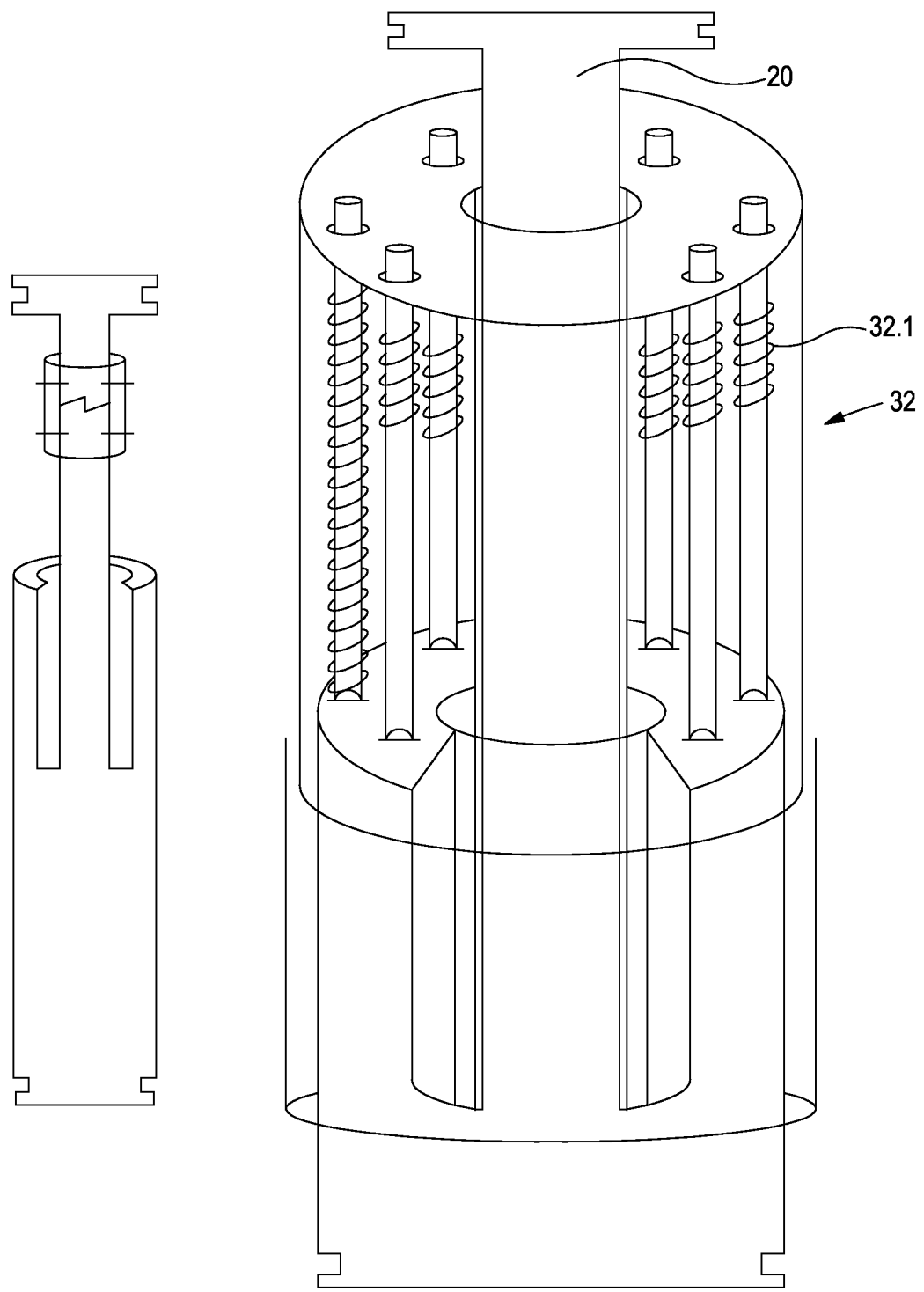
FIG. 4 shows another portion of the system shown in FIG. 1.

In some embodiments, the weight of the second piston 20 may be sufficient for the return movement of the second piston 20 to the lower position. In some embodiments, the return movement of the second piston 20 may be assisted by any suitable means that may store energy during movement of the second piston 20 to the upper position and release the energy to assist return movement of the second piston 20 to the lower position. In some embodiments the return means may comprise one or more accumulators 32. In some embodiments the one or more accumulators 32 may comprise springs 32.1 as illustrated in FIG. 4. The springs 32.1 are resiliently compressible and may be circumferentially arranged around the second piston 20, particularly around the piston shaft. The springs 32.1 may in one example embodiment be springs within springs. The springs may be open to the atmosphere or may be located in a self lubricating cylinder, wherein the springs are compressed by the displacement of the second piston 20 as described herein.

In some embodiments the one or more accumulators 32 may contain fluid that is displaced during movement of the second piston 20 to the upper position causing an increase in fluid pressure in the accumulator 32 that can be employed to assist return movement of the second piston 20 to the lower position. In some embodiments, the fluid in the one or more accumulators 32 may comprise a gas, for example air or a liquid, for example oil and be substantially incompressible, for example, hydraulic fluid. The one or more accumulators 32 for assisting return movement of the second piston 20 to the lower position may be used in place of or in addition to any of other means for assisting return movement of the second piston 20.

The actuator mechanism or cam arrangement 28 controlling movement of the first piston 26 may comprise a lever member 34 mounted for pivotal movement about a pivot axis 36 between the ends. A weight 38 may be provided at one end of the lever member 34 to cause the lever member 34 to pivot about the pivot axis in a clockwise direction as viewed in FIG. 1 and a weighted member 40 may be provided that can engage or co-operate with the other end of the lever member 34 to cause the lever member 34 to pivot about the pivot axis 36 in a counter-clockwise direction as viewed in FIG. 1. It will be appreciated that in some example embodiment, the weight 40 may be attached to the lever member 34.

In a modification shown in FIG. 3, the weight 38 causes the lever member 34 to pivot in a counter-clockwise direction and the weight 40 causes the lever member 34 to pivot in a clockwise direction. The first piston 26 is coupled to the lever member 34 to respond to pivotal movement of the lever member 34. The weight 40 may be attached to an elongate link member 42 such as a cable, rope, chain, or the like that passes over a guide member 44 such as a wheel and is attached at the other end to a fixed attachment point 46. 40 may be attached to the longer end of 34. The link member 42 co-operates with a cam device 48 that acts to displace the link member 42 to raise and lower the weight 40. The cam device 48 is rotatable, for example, by being driven by fluid exiting the second tower structure 12 and may comprise a plurality of cam members 50 uniformly spaced apart in the direction of rotation of the cam device 48 to engage the link member 42 in sequence as the cam device 48 rotates to raise and lower the weight 40. The weight 38 may act to pivot the lever member 34 in one direction (for example clockwise in FIG. 1 and counter-clockwise in FIG. 2) to move the first piston 26 towards the upper position. When the weight 40 is lowered to engage the member 34, the weight 40 overcomes the weight 38 and causes the member 34 to pivot in the opposed direction (for example counter-clockwise in FIG. 1 and clockwise in FIG. 2) to lower the first piston 26. When the weight 40 is raised, the weight 38 overcomes the weight 34 and causes the member 34 to pivot in said one direction (for example clockwise in FIG. 1 and counter-clockwise in FIG. 3) to move the first piston 26 to the upper position. The weight 38 may also take into account the friction loss when the first piston 26 is moving towards the upper position. The number and arrangement of the cam members 50 may be altered from that shown to provide any desired operation of the actuator mechanism 28.

Though not illustrated, the weight 40 may be replaced by a piston arrangement displaceable within a cylinder, wherein the piston arrangement comprises piston engagable in a reciprocating fashion with the one end of the lever 34 so as to displace the first piston 26 as described above.

The system may include one or more energy generating means 52a, 52b, 52c operable in response to fluid flow to generate electricity in a conventional manner (e.g., existing rotatable members used in hydroelectric installations), perform work, actuate machinery, etc. The energy generating means 52a, 52b, 52c may be configured to rotate in response to a flow of fluid. In this embodiment, the energy generating means 52a, 52b 52c is provided at three different levels, an upper or first level 54, an intermediate or second level 56 between the upper level 54 and a lower or third level 58. A flow of fluid from the reservoir 30 actuates the energy generating means 52a at the first level 54 and is collected downstream of the energy generating means 52a in a reservoir 60. A flow of fluid from the reservoir 60 actuates the energy generating means 52b at the intermediate level 56 and is collected downstream of the energy generating means 52b in a reservoir 62. A flow of fluid from the reservoir 62 actuates the energy generating means 52c at the lower level 58 and is collected downstream of the energy generating means 52c in a reservoir 64. Each energy generating means 52a, 52b, 52c includes at least one member configured to rotate in response to fluid flow. In this embodiment, each energy generating means 52a, 52b, 52c includes a wheel 66, a turbine 68 above the wheel 66 and a turbine 70 below the wheel 66. Each member 66, 68, 70 may comprise one or more elements, for example a plurality of fins 66a, 68a, 70a, onto which the water is directed to rotate the member 66, 68, 70. Each wheel 66 receives a flow of fluid directly from the reservoir above the wheel and/or indirectly from the reservoir above the wheel via the upper turbine 68. Each lower turbine 70 receives a flow of fluid from the wheel 66 and delivers the fluid to the reservoir below the wheel. The flow direction and/or flow rate of the fluid through the energy generating means 52a, 52b, 52c may be controlled by valves. One or more turbines 68, 70 may also operate a pump 72 for supplying oil to lubricate moving parts of the various devices. It will be understood that any number of energy generating means may be provided with any suitable configuration and the invention is not limited to the above arrangement of wheels and turbines. It will also be understood that the energy generating means may comprise other mechanical devices that may receive fluid to produce energy.

In one example embodiment, the means 52a may comprise a cam device similar to device 50 and its own actuator arrangement 28 so as to raise and lower the first piston 26 in addition to generating energy. In addition, in some example embodiments, the means 52a, 52b, and 52c may comprise suitable step up gear arrangements to increase the output thereof in response to being driven by fluid from the second column 12.

In this embodiment, the cam device 50 controlling operation of the actuator mechanism 28 is associated with the energy generating device 52b although this may not be essential and other arrangements of the cam device 50 are possible. 52A, 52B and 52C may have a central step up gear arrangement that allows the external shaft associated to it, to rotate faster.

In a modification (not shown), an actuator mechanism similar to the actuator mechanism 28 may be provided to control and/or assist up and down movement of the second piston 20 in the second tower structure 12. A cam device similar to the cam device 50 may be provided for controlling operation of the actuator mechanism. The cam device may be associated with the energy generating device 52c although this may not be essential and other arrangements of the cam device are possible.

A passageway 73 connects the reservoir 64 to the second tower structure 12 to replace fluid that has been discharged from the second tower structure 12 into the reservoir 30 during the upstroke of the second piston 20 as described previously. The passageway 73 may include a valve and other reservoir outlets. 74A to control flow of fluid from the reservoir 64 to the second tower structure 12. The tower structure 12 may include a valve 76 above the second piston 20 to control movement of fluid within the second tower structure 12. Valves 74, 76 may be configured as non-return valves that allow fluid to flow through the valve in one direction only. During the downstroke of the second piston 20, the valve 74 closes and the valve 76 above the second piston 20 in the second tower structure 12 opens so that fluid in the second tower structure 12 is raised and exits the second tower structure 12 at the upper end as described previously. When the second piston 20 reaches the upper position, the valve 76 closes so that during the downstroke of the second piston 20, an inlet chamber 78 is formed between the second piston 20 and the valve 76. As the second piston 20 is returning to its lower position, the valve 74 opens to fill the inlet chamber 78 with fluid from the reservoir 64. The valve 74 then closes and the valve 76 opens as the next upstroke of the second piston 20. In some embodiments a filter 75 may be provided in the passageway to filter fluid flowing from the reservoir 64 to the second tower structure 12. In some embodiments a service valve 74A may be provided in the passageway 73 and a service valve 76A may be provided in the second tower structure 12 above the valve 76. The service valves 74A, 76A are normally open and can be closed to prevent flow of fluid, for example when carrying out maintenance or repair work. In a modification shown in FIG. 3, the second tower structure 12 may receive fluid from more than one reservoir 64A, 64B. In another modification shown in FIG. 3, the second tower structure 12 may be of reduced cross-section above or below the valve 76 to reduce weight and/or assist raising the fluid within the second tower structure 12 during the upstroke of the second piston 20.

As will be understood, the upper region of the second tower structure 12 above the second piston 20, and reservoirs 30, 60, 62, 64 provide a circuit for circulation of fluid employed to actuate the energy generating means. Loss of fluid for any reason, such as leakage, evaporation or the like may be made up by one or more external fluid sources 80. Where the fluid is water, the external fluid source 80 may be any convenient, available source of water, for example, from rivers, sea, lakes, and/or municipal water sources. A respective external fluid source 80 may be provided for each reservoir 30, 60, 62, 64. The external fluid source 80 may be operable to maintain a pre-determined water level in each reservoir 30, 60, 62, 64. The external fluid source 80 may comprise a float operated valve for controlling addition of fluid to the system. Means (not shown) may be provided for transferring fluid between the reservoirs 30, 60, 62, 64. A respective transfer means may be provided for each reservoir 30, 60, 62, 64. The transfer means may comprise a pump. Means 82 may be provided for storing fluid for addition to the reservoirs 30, 60, 62, 64. A respective storage means 82 may be provided for each reservoir 30, 60, 62, 64. The storage means 82 may comprise a tank. The storage means 82 may be provided with an external fluid source 80 similar to the reservoirs 30, 60, 62, 64 and may be provided with a valve 84 responsive to fluid level in the associated reservoir 30, 60, 62, 64 to transfer fluid to maintain a desired fluid level in the reservoir 30, 60, 62, 64. The first tower structure 14 may be provided with a reservoir 88 for fluid in the first tower structure 14 by means of which a required volume of fluid in the first tower structure 14 can be maintained. A valve 90 may be provided for adding fluid to the reservoir 88 and a valve 92 may be provided for adding fluid to the first tower structure 14. The reservoir 88 may communicate with the upper end of the first tower structure 14 below the first piston 26 when the first piston 26 is in the upper position.

It will be appreciated that the displacement of the first and second pistons 26, 20 is arranged in a synchronised manner.

Figure 5:
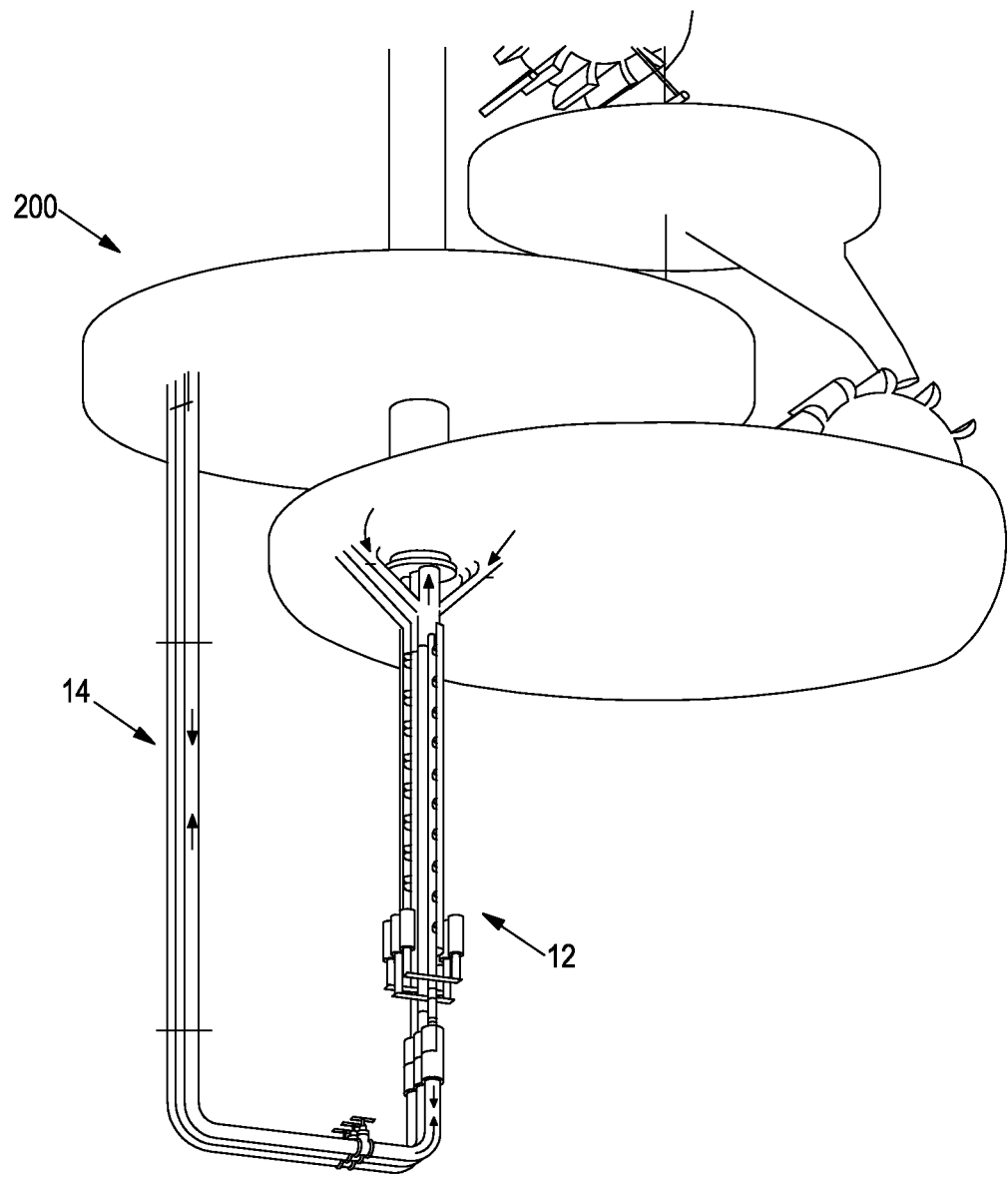
FIG. 5 shows a system in accordance with an example embodiment of the invention.

Referring to FIG. 5 of the drawings, where a system 200 is illustrated. The system 200 is substantially similar to the system described above but it will be noted that multiple first and second tower structures 14, 12 may be used to generate energy in a similar fashion as described herein.

Figure 6:
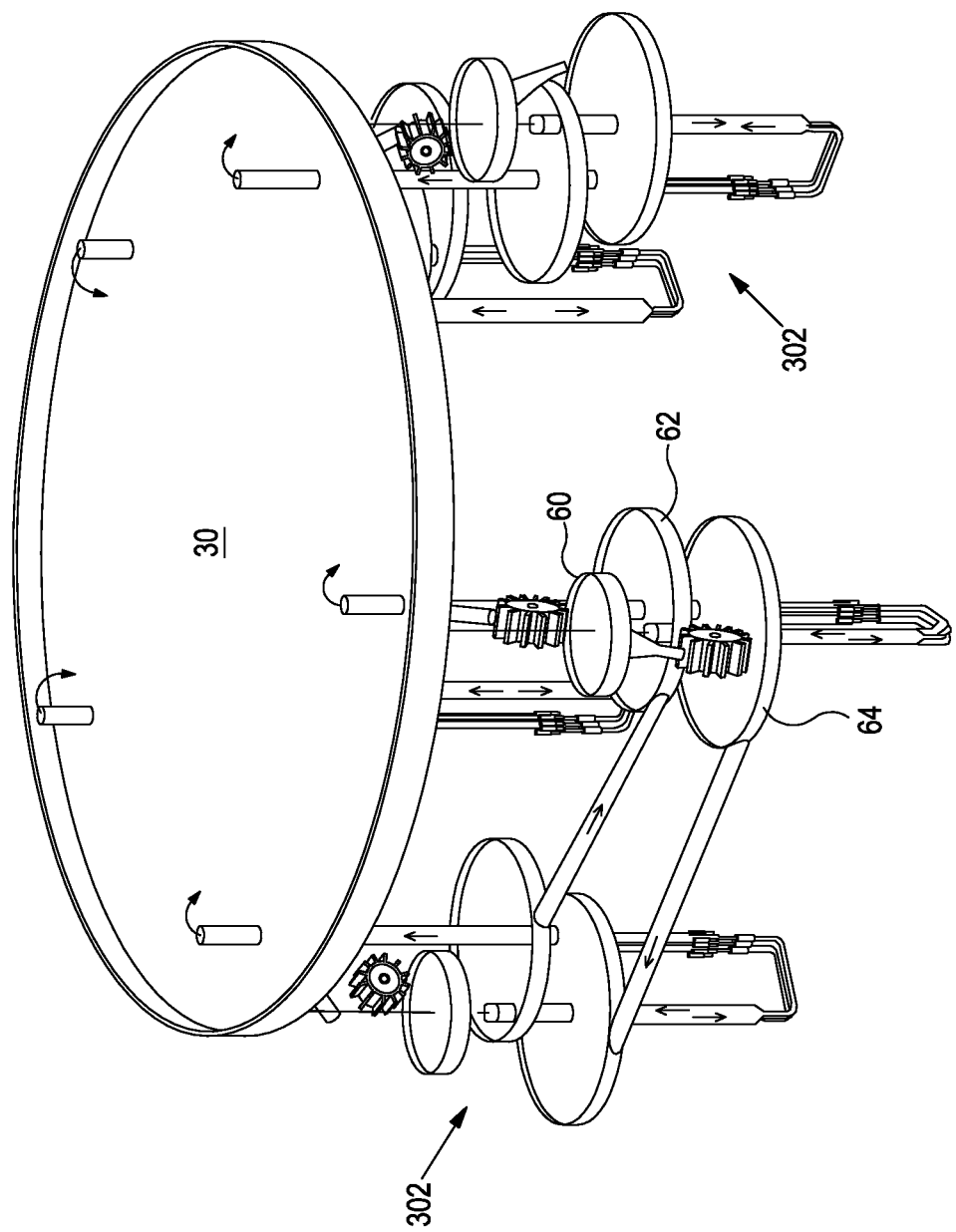
FIG. 6 shows another system in accordance with an example embodiment of the invention.

Referring to FIG. 6 of the drawings, where another system 300 in accordance with an example embodiment of the invention is illustrated. The system 300 is substantially similar to the system described above but in order to increase energy output from 52c and 68, the volume of fluid introduced thereto may be increased by the use slave pump arrangements 302. Fluid from bank of slave pumps increases the volume of fluid in reservoir 62 and 64.

As will be appreciated, the invention provides a cleaner means of generating energy than conventional systems. As the source of fluid may, for example, be sea water, the invention described herein can use natural resources to generate energy in a clean manner with minimal pollutant, if any, by-products.

It will be understood that the invention is not limited to the embodiment above-described and that modifications and improvements may be made without departing from the concepts disclosed herein. For example, any part of the apparatus may be repeated such that capacity of the apparatus may be increased. The apparatus may be installed on land and/or water. The apparatus may be installed above the ground or water level, below the ground or water level or part above and part below the ground or water level as may be appropriate for any given location of the apparatus. The apparatus may be configured so that some parts of the apparatus operate automatically and/or function synchronously with other parts of the apparatus. The apparatus may include additional means for generating energy for any purpose such as when starting the apparatus. Such additional means may comprise one or more solar panels.

It will also be understood that any feature of the apparatus may be used separately or in combination with any other feature and the invention extends to and includes all such uses.

The invention claimed is:

1. A system for generating energy from a liquid flow, comprising
    a first tower structure forming part of a first liquid circuit;
    a second tower structure forming part of a second liquid circuit, wherein the first and second liquid circuits are fluidly insulated from each other;
    a first displacement member slidably received in a fluid tight manner in the first tower structure and operable, in response to liquid flow from an upper reservoir, to displace liquid in the first tower structure, the upper reservoir connected, in use, to an external liquid source that supplies the upper reservoir with liquid in response to loss of liquid to maintain a predetermined liquid level in the upper reservoir;
    a second displacement member fluidly separating the first fluid circuit from the second fluid circuit and operable, in response to liquid displaced in the first tower structure by the first displacement member, to displace liquid in the second tower structure;
    wherein, in use, displacement of liquid in the second tower structure causes said liquid to exit the second tower structure through at least one outlet; and
    an energy generating device operable, in response to liquid displaced from the second tower structure and liquid flow from the upper reservoir, to generate energy,
    wherein the upper reservoir is configured to receive liquid from the external liquid source to maintain a liquid level for operation of the system.

2. The system as claimed in claim 1, wherein the first displacement member comprises a first piston within the first tower structure moveable, in response to liquid flow from the upper reservoir, between a first position and a second position, wherein liquid is displaced in the first tower structure in response to movement of the first piston from the first position to the second position.

3. The system as claimed in claim 2, wherein the system comprises a cam arrangement operable, by liquid exiting the second tower structure and liquid flow from the upper reservoir, to displace the first piston in a reciprocating fashion between the first and second positions.

4. The system as claimed in claim 3, wherein the cam arrangement comprises:
a cam displaceable in response to liquid displaced from the second tower structure and liquid flow from the upper reservoir or from the external source;
a weighted member having a mass, wherein the weighted member is mechanically coupled to the cam to be raised and lowered by the cam in response to the displacement of the cam; and
a lever coupled at one end to the first piston, wherein the weighted member is configured to be raised and lowered onto an opposite end of the lever in response to displacement of the cam caused by liquid flow from liquid exiting the upper reservoir so as to cause reciprocating driving of the first piston between the first and second positions within the first tower structure.

5. The system as claimed in claim 1, wherein the second displacement member comprises a second piston moveable, in response to liquid displaced in the first tower structure, between first and second positions within the second tower structure, wherein in moving from the first position to the second position the second piston is operable to displace liquid in the second tower structure.

6. The system as claimed in claim 5, wherein the first tower structure comprises an elongate main tower, a transverse portion extending transversely from the main tower, and a secondary tower extending transversely to the transverse portion and parallel to the main tower, wherein the second piston is located in the secondary tower of the first tower structure and the second tower structure such that the second piston couples the first and second tower structures.

7. The system as claimed in claim 5, wherein the second piston comprises an accumulator configured to store energy as the second piston moves from the first position to the second position and the stored energy is released to assist return movement of the second piston from the second position to the first position.

8. The system as claimed in claim 1, wherein the energy generating device operable for generating energy in response to liquid displaced from the upper reservoir comprises one or more devices responsive to liquid displaced from the second tower structure to provide an output for generating energy.

9. The system as claimed in claim 1, wherein the upper reservoir, in use, operates in communication with one or more taps or valves fluidly coupled to the external liquid source, the external liquid source selected from a group comprising a river, sea, spring, lake, municipal water source.

10. The system as claimed in claim 1, wherein the system further comprises a lower reservoir for collecting liquid exiting the upper reservoir downstream of the energy generation device, and wherein the lower reservoir, in use, is connected to the second tower structure via a passageway configured to replace fluid that is discharged from the second tower structure during an upstroke of the second displacement member.

11. The system as claimed in claim 10, wherein:
the second tower structure comprises first and second non-return valves, the first valve configured to control flow of fluid from the lower reservoir to the second tower structure, and the second valve configured to control movement of the fluid within the second tower structure,
during an upstroke of the second displacement member, the first valve is configured to close while the second valve is configured to open, causing fluid in the second tower structure to raise and exit an upper end of the second tower structure; and
during a downstroke of the second displacement member, the second valve is configured to close while the first valve is configured to open, causing fluid in the lower reservoir to flow into second tower structure to replace the fluid discharged from the second tower structure during the upstroke of the second displacement member.

12. A method of generating energy from a liquid flow comprising:
providing a first tower structure forming part of a first liquid circuit containing liquid;
providing a second tower structure forming part of a second liquid circuit containing liquid, wherein the first and second liquid circuits are fluidly insulated from each other;
using liquid flow from an upper reservoir to displace, via a first displacement member slidably received in a fluid fight manner in the first tower structure, liquid in the first tower structure, the upper reservoir connected, in use, to an external liquid source that supplies the upper reservoir with liquid in response to loss of liquid to maintain a predetermined liquid level in the upper reservoir;
using liquid displaced in the first tower structure to displace, via a second displacement member that fluidly separates the liquid in the first fluid circuit from the second fluid circuit, liquid in the second tower structure and cause liquid to exit the second tower structure through at least one outlet;
using liquid exiting the second tower structure and liquid flow from the upper reservoir to generate energy;
collecting liquid exiting the second tower structure downstream of the energy generation; and
providing the external source of liquid for maintaining a liquid level for carrying out the method.

13. The method as claimed in claim 12, wherein the using the liquid displaced in the first tower structure comprises displacing the second displacement member in the second tower structure from a first position to a second position in the second tower structure in a piston fashion.

14. The method as claimed in claim 12, wherein the method comprises providing the external source of liquid from one or more of a lake, sea, spring, municipal water source, wherein the liquid is primarily water.

* * * * *